Patented June 18, 1929.

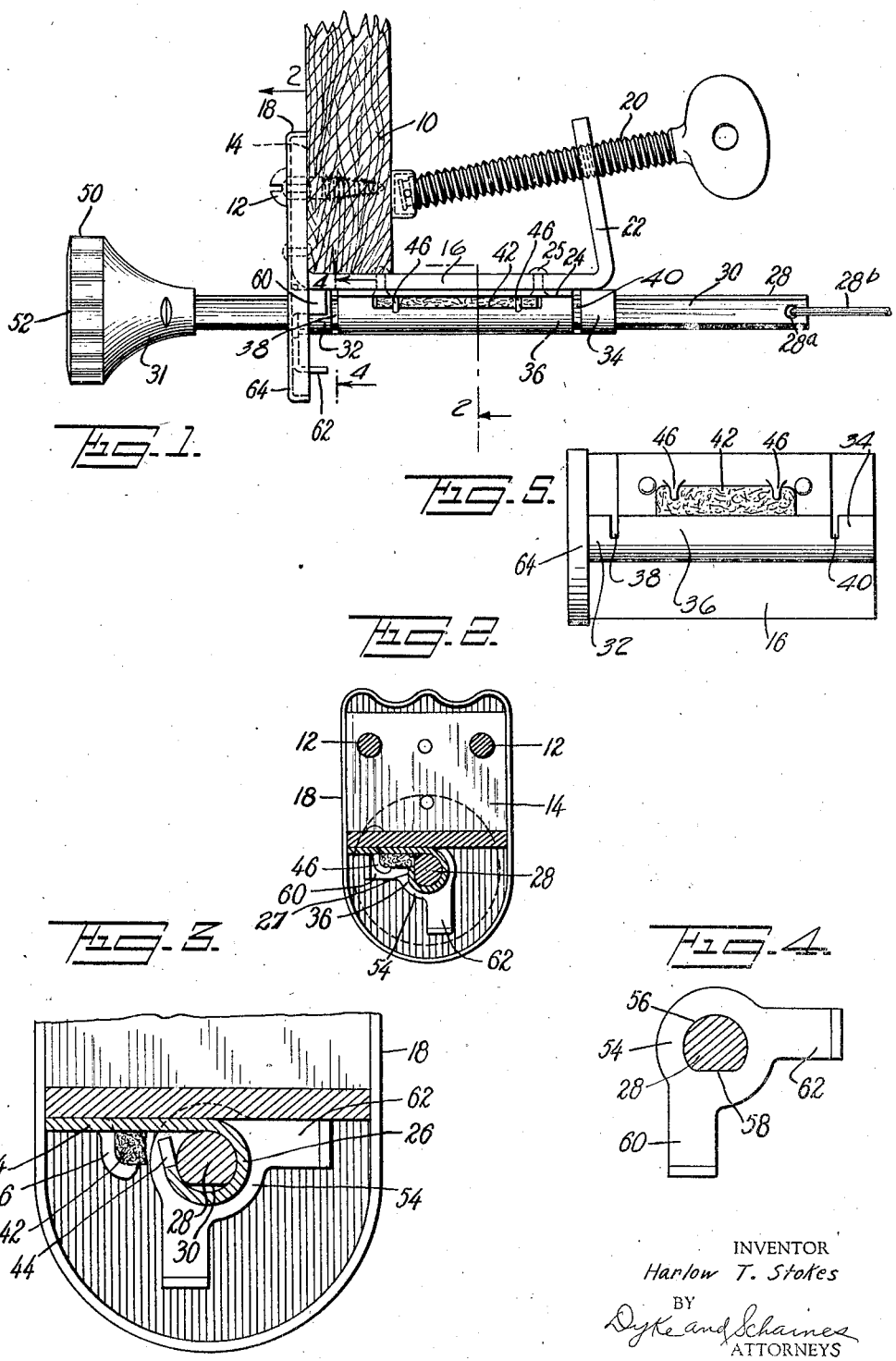

1,717,948

UNITED STATES PATENT OFFICE.

HARLOW T. STOKES, OF BROOKLYN, NEW YORK, ASSIGNOR TO METAL STAMPING COMPANY, OF LONG ISLAND CITY, NEW YORK, A CORPORATION OF NEW YORK.

LOCKING ADJUSTER.

Application filed July 30, 1927. Serial No. 209,530.

My invention relates to a locking adjuster for devices comprising relatively movable parts, such as automobile ventilators, radiator shutters, heaters, chokes, and the like.

The device of this invention is adapted to be attached as a control to the above mentioned or other instruments, and may be fastened at some convenient point, as on the dashboard when used in an automobile.

The device of my invention comprises a rod provided with a knob or handle, and a bushing in which the rod is received so as to be capable of both longitudinal and rotative movement in the bushing bore. The rod and bushing are so constructed that the rod, when in certain rotative relation or relations to the bushing, can be freely moved longitudinally in the bushing bore and the controlled part thereby adjusted to any desired position, and when the rod is rotated to another position or positions in the bushing bore (or, alternatively, the bushing rotated relative to the rod if the latter be the fixed element) the rod will be frictionally locked or clamped in the bushing. In this way the controlled part to which the rod is attached, such as shutter leaves for example, may be adjusted to any desired position by an operator grasping the knob or handle and freely moving the rod in or out a suitable distance and then locking it in such position by turning the knob and thereby the rod in the bushing.

In the illustrative form shown herein for affording an understanding of my invention and the principle of its operation, the rod is generally cylindrical, except for a part which is made substantially eccentric, as by flattening or cutting away the material of an originally round rod, and the bushing bore is correspondingly flattened on one side, to coact with the rod to permit free longitudinal movement of the latter when the rod is turned so that the flattened part thereof is adjacent the flat part of the bushing bore and to exert a frictional clamping action on the rod upon turning the rod through a partial turn with respect to the bushing bore.

The bushing is provided with a suitable clamp or fastener for attaching the device to the instrument board of an automobile, or in other places where it is to be used.

Lubrication means are preferably provided, as, for example, a felt pad may be attached to the device in such manner as to extend through an aperture in the bushing and supply oil to the rod in the bushing bore.

Stop means for limiting the turning movement of the rod in the bushing are preferably provided, and in the form shown herein, the rod is passed through a washer with a flat sided hole therein to prevent turning of the washer on the rod, and the washer is provided with stop arms to limit rotative movement of the rod in the bushing in both directions.

In the accompanying drawing, Fig. 1 is a side view of the device attached to the instrument board of an automobile by means of screws and a screw clamp. Fig. 2 is a section on the line 2—2, Fig. 1. Fig. 3 is an enlarged view similar to a part of Fig. 2, with the rod turned through substantially a quarter turn. Fig. 4 is a section on the line 4—4 of Fig. 1 and showing the relation between the rod and the stop washer, and Fig. 5 is a bottom plan view of the fixed or bushing member with the rod removed.

In Fig. 1 the device is attached to the automobile instrument board 10, by screws 12, 12, passing through holes in the bent up portion 14 of bracket 16 and through corresponding holes in the face plate 18, which is preferably riveted to portion 14 of bracket 16, and also by the clamp screw 20 passing through a threaded hole provided in the bent up portion 22 on the rear end of bracket 16. The clamp screw 20 may be used alone and is also useful when attaching by screws.

Reference character 24 designates the bushing member which is attached to bracket 16 by means of rivets 25 and is preferably formed of sheet metal bent in forming dies to provide a sleeve or bushing 26 having a substantially flat side 27. The rod 28, which is cylindrical except for a flat side 30, is adapted to be received in the bore of bushing 26. Rod 28 is provided at one end with a connecting means, as a hole 28$^a$ for attachment of a wire connector 28^b to a part to be operated, and is provided at its other end with a handle or knob 31. The rod can slide freely in bushing 26 when the flattened sides of bushing 26 and rod 28 correspond, as in Fig. 2, but when rod 28 is rotated within the bushing to a position or positions so that the flat side 30 of rod 28 is not adjacent to the flat side 27 of bushing 26, as in Fig. 3, rod 28 is frictionally held from sliding by the clamping effect of bushing 26 which has a spring-like action in that it is not a closed cylinder but open along one edge, thus permitting it to be expanded somewhat by pressure.

The two end portions 32, 34 of the bushing 26 are cylindrical, having no flattened parts, and serve as guides for the rod 28, the flat side wall 27 being confined to the portion 36 of bushing 26 intermediate of the end portions 32, 34, and partially separated therefrom by the cut-outs 38, 40.

An oil pad 42 is provided for lubrication of rod 28 and preferably extends through opening 44 in the free margin of bushing 26. Oil pad 42 is held in place by any suitable means, such as the clamp fingers 46, and the expansion and contraction of bushing 26 operates automatically to feed oil from oil pad 42 to rod 28.

The knob 31 on rod 28 may be formed of sheet metal and is preferably attached to the rod by compressing a portion of one side into a suitable groove provided in the rod near its end. A cap 50 holding an ornamental material button 52 is crimped on the end of the handle and is formed to provide a grip for turning.

Rod 28 is passed through a washer 54 having an opening 56 therein with a flat side 58, so that the washer turns with the rod. Washer 54 has two projecting stop arms 60, 62, as shown in Fig. 4. Said stop arms, stopped by bracket 16, limit the rotative movement of rod 28, arm 60 being arranged to stop rotation of rod 28 with its flat side adjacent to the flat side of the bushing so that the rod can be moved freely, as in Fig. 2, and arm 62 permitting a quarter turn of rod 28 to locking position, as in Fig. 3. Stop washer 54 is held from longitudinal movement with rod 28 by being received between the end of bushing 26 and the extension 64 of the face plate 18.

The friction control device of my invention is relatively simple and so cannot easily get out of order, is inexpensive to manufacture, is easily installed, is quick and certain in operation, and permits controlled parts to be securely locked in any desired position.

I claim:

1. A friction control device comprising a rod with flattened side or sides, an expansible and contractible bushing or sleeve with similarly flattened side or sides, said rod being free to slide in said bushing when flattened sides correspond, but clamped by friction from sliding when said rod is turned so that flattened sides of rod and bushing do not correspond, said rod having at one end a knob or handle and at the other end being provided with means for attachment to the instrument or device to be controlled, a bracket attached to said bushing for fastening it in place, and an oil pad adapted to automatically oil the rod.

2. A device of the character described comprising an expansible-contractible bushing having a relatively flattened portion, an actuating rod of corresponding cross-section slidable therein, and frictionally gripped by said bushing upon rotation of said rod, and an oil pad extending into said bushing, and adapted to engage the rod for oiling the rod.

3. A device of the character described comprising a member including a looped portion forming an expansible-contractible bushing and a portion extending therefrom over the free edge of said looped portion for attachment of the member to a support; said looped portion having a relatively flattened part, and an actuating rod having a cross-section corresponding to the cross-section of said bushing; said rod being slidable therein, and gripped by said bushing upon rotation of said rod to another position.

4. A device of the character described comprising a bracket, means for securing said bracket to a support, a sheet metal member including a resilient looped portion and a portion extending over the free edge of said looped portion and attached to said bracket; said looped portion having an eccentric cross-section, and an actuating rod of corresponding cross-section slidable in said looped portion and rotatable therein into locking position.

5. A device of the character described comprising a bracket, means for securing said bracket to a support, a member including a resilient looped portion having a recess in the free edge thereof and a portion extending over said free edge for attachment to said bracket, an actuating rod slidable axially through said looped portion and rotatable into locking position relative thereto, and an oiling pad carried by the attaching portion of said member and extending into said recess between said portions.

6. A device of the character described comprising an elastic bushing, an actuating rod of corresponding cross-section slidable therein and rotatable therein into locking and unlocking positions, and a member keyed upon said rod engagable with contiguous portions of the device for limiting the rotation of the rod.

7. A device of the character described comprising a support, an elastic bushing on said support; said bushing having a relatively flattened portion, an actuating rod of corresponding cross-section slidable through said support and said bushing and rotatable therein into locking and unlocking positions, a member having an opening corresponding in cross-section with the cross-section of said rod and receiving the same intermediate said support and said bushing, and arms on said member adapted to engage contiguous portions of the device for limiting the rotation of the rod in either direction.

In testimony whereof, I have signed my name hereto.

HARLOW T. STOKES.